United States Patent [19]

DeCoursey et al.

[11] Patent Number: 5,008,051
[45] Date of Patent: Apr. 16, 1991

[54] VACUUM SIZING TANK WITH ELECTRONICALLY CONTROLLED VACUUM PRESSURE

[76] Inventors: Robert T. DeCoursey, 199 Euclid, Bloomingdale, Ill. 60108; Mikel J. Messick, 784 Red Oak Dr., Bartlett, Ill. 60103

[21] Appl. No.: 317,681

[22] Filed: Mar. 1, 1989

[51] Int. Cl.$^5$ .............................................. B29C 43/22
[52] U.S. Cl. ................................. 264/40.3; 264/101; 264/237; 425/71; 425/149
[58] Field of Search ................. 62/215, 216, 224, 226, 62/255, 228.4; 417/45; 264/40.1, 40.3, 237, 101, 102; 425/135, 149, 71

[56] References Cited

U.S. PATENT DOCUMENTS

| | | | |
|---|---|---|---|
| 3,039,142 | 6/1962 | Zauasnik | 264/237 |
| 3,360,185 | 12/1967 | Wooldridge | 417/45 |
| 3,538,210 | 11/1970 | Gatto | 264/237 |
| 4,015,182 | 3/1977 | Erdman | 62/228.4 |
| 4,152,380 | 5/1979 | Graves et al. | 264/40.1 |
| 4,154,563 | 5/1979 | Johnson | 425/140 |
| 4,181,487 | 1/1980 | Kessler | 264/566 |
| 4,271,107 | 6/1981 | Phipps | 425/DIG. 60 |
| 4,340,340 | 7/1982 | Brown et al. | 425/71 |
| 4,375,753 | 3/1983 | Imasu et al. | 62/225 |
| 4,411,613 | 10/1983 | Gauchel et al. | 264/568 |
| 4,487,731 | 12/1984 | Kobayashi | 425/DIG. 60 |
| 4,571,951 | 2/1986 | Szymazek | 62/225 |
| 4,595,342 | 6/1986 | Christlieb et al. | 417/45 |
| 4,655,688 | 4/1987 | Bohn et al. | 417/45 |
| 4,765,150 | 8/1988 | Persem | 417/45 |
| 4,783,291 | 11/1988 | Pagan | 264/101 |

Primary Examiner—Willard E. Hoag
Attorney, Agent, or Firm—Eugene F. Friedman

[57] ABSTRACT

A vacuum system for a vacuum sizing tank utilizing electronic controls to maintain the proper negative pressure within the tank. A transducer measures the tank's vacuum. An electronic circuit compares the measured value with the preset value. Any discrepancy between the two undergoes resolution by varying the voltage applied to the variable-speed d.c. controlled vacuum pump. The resulting changes in the motor's speed brings the tank's vacuum to the desired magnitude. The continuous measurement of the vacuum and its feedback to the speed of the vacuum pump results in the maintenance of the desired vacuum within the sizing tank.

16 Claims, 2 Drawing Sheets

VACUUM SIZING TANK WITH ELECTRONICALLY CONTROLLED VACUUM PRESSURE

BACKGROUND

A common method for forming parts from plastic involves the extrusion of material from an extruder. The extruded plastic, however, remains in the molten state immediately upon its passage out of the extruder As a consequence, it can suffer serious deformation between the time of its extrusion and the time that it has cooled sufficiently to become solid.

Accordingly, the molten extrudate must experience strictly controlled conditions until it solidifies. Various types of sizing or calibrating tools to accomplish this objective appear in U.S. Pat. Nos. 4,181,487 to M. Kessler and 4,411,613 to P. Gauchel et al.

A technique finding frequent use involves feeding the molten extrudate into a water bath. Devices for determining the extrudate's size or thickness and then controlling the speed at which it passes through a sizing die or sleeve and then into a cooling tank appears in U.S. Pat. Nos. 4,137,025 to K.E. Graves et al. and 4,154,563 to K.G. Johnson.

The water through which the molten extrudate travels, however, may exert a significant pressure on the extrudate before it can solidify to retain its shape. This pressure may result in the undesired deformation of the shape of the final product. In particular, this represents a likely result when the extrudate takes the form of a closed tube.

To prevent the pressure of the cooling water from deforming the molten extrudate, many cooling tanks will actually place its contents under a negative pressure. The vacuum within the sizing tank combined with the application of higher pressure inside the extrudate help maintains the shape of the latter until it can solidify. G.R. Brown et al.'s U.S. Pat. No. 4,340,340 shows a separator which finds use with a vacuum sizing tank. The separator attaches to a vacuum pump on the tank and permits the separation of liquid from gas prior to the entrance of the former into a liquid pump and the latter to a vacuum pump.

However, controlling the vacuum itself within the tank represents an important task. A variation in the actual pressure within the tank will result in a nonuniform product; a decrease in the pressure may produce a larger tube while an increase in pressure may result in the opposite effect.

Previously, two types of efforts found use to control the vacuum within the sizing tank. The first simply constituted a manual attempt to maintain the vacuum constant. In this situation, an operator simply watched a vacuum gauge. If the vacuum in the tank, as reflected on the gauge, increased, he slightly opened a valve leading into the vacuum tank. This allowed in additional external air pressure. This resulted in a decrease of the vacuum.

If the vacuum pressure became less than desired, the operator closed somewhat the valve to the external atmosphere. This increased the magnitude of the vacuum.

However, the effort of maintaining the vacuum constant through the manual adjustment of a bleeder valve displays severe limitations. First, it requires the constant presence of an operator at all times. Secondly, the constancy of the vacuum within the tank depends upon the speed of the operator's reaction while constantly watching the gauge.

A more recent effort to control the vacuum within the sizing tank involved the use of a bleeder valve automatically controlled by weights. Changing the amount of weights employed results in the varying of the vacuum achieved within the tank.

This technique represents a mechanical effort to solve the problem. However, the bleeder valve itself can become clogged because of the liquid environment in which it exists, dirt, or the like. Furthermore, it requires the keeping of weights of various magnitudes in a clean, stable, and available condition so that they may find use in particular applications. As a result, the search continues for a reliable technique to maintain the vacuum within the sizing tank at a known, constant value.

SUMMARY

Utilizing an electrical feedback system to control the vacuum applied to a vacuum sizing tank will result in a more uniform vacuum pressure As a result, the final product whose manufacture involves the passage of molten plastic through the sizing tank will display a greater uniformity.

Typically, a vacuum sizing tank includes an enclosed trough capable of holding water and a vacuum. A molten plastic extrudate enters the trough through a first opening, and the cooled plastic departs through a second opening. A vacuum device supplies a negative pressure to the trough.

The trough remains substantially closed to the atmosphere. This means, in particular, that the trough is structurally closed and that there is no operational bleeder valve in communication with the trough used to control the vacuum pressure within the trough by the admission of varying amounts of atmospheric pressure. Naturally, no vacuum is perfect. Thus the vacuum trough, though substantially closed to the atmosphere, may have some atmospheric pressure leaking in through the seals as well as the first and second openings. Furthermore, the trough may also include a valve to allow for the ingress of atmospheric pressure when, for example, releasing the vacuum at the end of a run.

Providing for the close control of the vacuum within the trough first requires that the vacuum device may apply any of a plurality of different negative pressures. To take advantage of this, a detector that couples to the trough determines the pressure within. Lastly, a controllor device couples to the detector and to the vacuum device. When the detector determines that the pressure has fallen below a predetermined value, it causes the vacuum device to decrease the negative pressure applied to the trough. On the other hand, when the detector learns that the pressure in the trough has risen above the predetermined value, the vacuum device increases the negative pressure it exerts.

In most instances, the vacuum sizing tank will include a selector which couples to the controllor device. It will allow for the selection of the predetermined value of the vacuum within the tank from any of a plurality of such values. Thus, the operator decides upon the particular vacuum that the tank should experience for the particular product. The detector and the controlled device then results in the vacuum pump maintaining that particular pressure within the tank.

The method of maintaining the negative pressure in a vacuum sizing tank at a predetermined value involves first applying a negative pressure to the tank with a vacuum device. The vacuum device should have the ability of applying any one of a plurality of different negative pressures.

The pressure within the tank should then undergo determination. If the pressure has fallen below the predetermined value, the negative pressure applied by the vacuum device should be reduced. Naturally, if the pressure within the tank rises above the desired level, then the negative pressure applied by the vacuum device must increase. Most often, the method would also involve the step of selecting the value within the tank from a variety of possible vacuum levels.

DETAILED DESCRIPTION

Figures 1, 2:
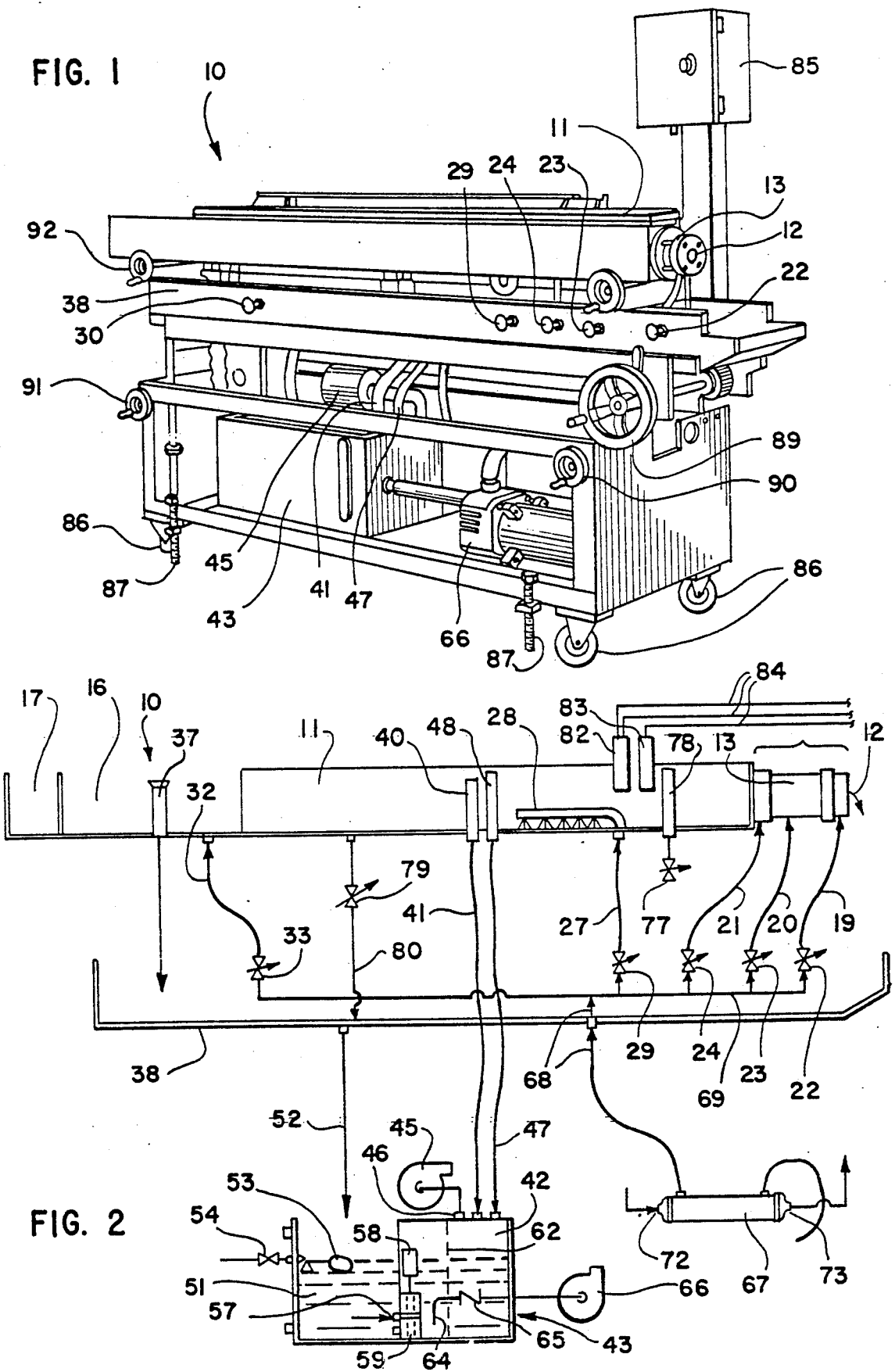
FIG. 1 provides an external view in perspective of a vacuum sizing tank having electronically controlled vacuum pressure.
FIG. 2 gives a diagramatic view of the components of the vacuum sizing tank of FIG. 1.

FIGS. 1 and 2 show a vacuum sizing tank system generally at 10. The molten extrudate undergoes cooling in the actual trough 11 which holds both water and the vacuum. To enter the tank 11, the molten extrudate enters through the opening 12 of the vacuum sizing tooling 13 through which it passes to reach the tank 11. After passing through the vacuum chamber 11, the cooled plastic then enters the water bath 16. From there it goes to the air wipe 17 where excess water may drain from it.

The water that cools the plastic enters the tooling 13 through the lines 19, 20, and 21 controlled by the valves 22, 23, and 24, respectively. Similarly, the line 27 provides water to the spray tube 28 to partially fill the vacuum chamber 11. The valve 29 controls that source of water. Lastly, the line 32, under the control of the valve 33, provides water to the water bath 16.

In operation, the standpipe 37 controls the level of water in the bath 16. The excess of water there passes through the standpipe 37 to the drip pan 38.

Similarly, during the course of operation, the standpipe 40 controls the water height in the vacuum tank 11. From there, the water passes along the line 41 to the closed chamber 42 of the reservoir 43. The reservoir 43 and the vacuum tank 11 have fluid communication with each other, but remain closed to the atmosphere. Thus, the vacuum in one of these components appears in the other.

In fact, the variable speed d.c. controlled vacuum pump 45 applies its vacuum through the inlet 46 of the vacuum chamber 42. This vacuum then travels along the line 47 and through the pipe 48 to the tank 11.

As seen in FIG. 2, the standpipe 40 for the water in the tank 11 has a lower level than the pipe 48 for the vacuum. Furthermore, the vacuum line 47 opens into the top of the vacuum reservoir 42. As a consequence, the line 47 obtains no water and remains open between the space above the water in the tanks 11 and 42. No water will pass through the pipe 48 to possibly clog it and prevent the effect of the vacuum in the reservoir 42 from reaching the tank 11.

The water for the systems initially appear in the open chamber 51 of the reservoir 43. The open chamber 51 itself has two sources of water. Initially, it collects the water falling into the drip pan 38 which passes it along the line 52. Further, the float 53 in the open chamber 51 controls the valve 54, connected to a supply of water. Should the level in the open reservoir 51 fall too low, the float 53 opens the valve 54 to raise the water to the desired level.

Water from the open reservoir 51 may then pass into the closed reservoir 42 through the opening 57. The float 58 controls the valve 59 to provide the appropriate height of water in the closed chamber 42.

Additionally, water may enter the closed chamber 42, as discussed above. It travels along the line 41 from the standpipe 40 in the vacuum chamber 11.

To further provide an even constant vacuum pressure, the closed reservoir 42 includes the baffle 62. This baffle 62 will prevent waves that might accompany the introduction of water through the float 47 or the movement of the float 58 itself from reaching the vacuum line 47.

Water from the closed reservoir 42 passes along the line 64, through the one-way check valve 65, and to the water pump 66. The pump 66 in turn pushes it through the heat exchanger 67 to the line 68 and then into the manifold 69. The manifold 69, in turn, provides it to the lines 19, 20, 21, 27, and 32 as discussed above. The heat exchanger 67 has the inlet 72 of cold water and the outlet 73 of tepid water.

In FIG. 2, the valve 77 permits the release of vacuum in the tank 11 through the pipe 78. Additionally, the valve 79 allows water within the vacuum tank 11 to drain along the line 80 into the drip pan 38.

Additionally, the pressure transducer 82 and the temperature transducer 83 within the tank 11 and provide their information along the leads 84. The information provided by these transducers appears in the circuit diagram of FIG. 3 and the control box 85 in FIG. 1.

The vacuum sizing tank system 10 moves on the wheels 86. It will undergo final adjustment by the leveling screws 87.

To achieve the exact positioning of the vacuum tank 11 and the sizing tooling 13, the wheel 89 moves the tank 11 upstream and downstream. The wheels 90 and 91 move their respective ends vertically, while the wheel 92 moves the tank 11 forward and backward.

Figure 3:
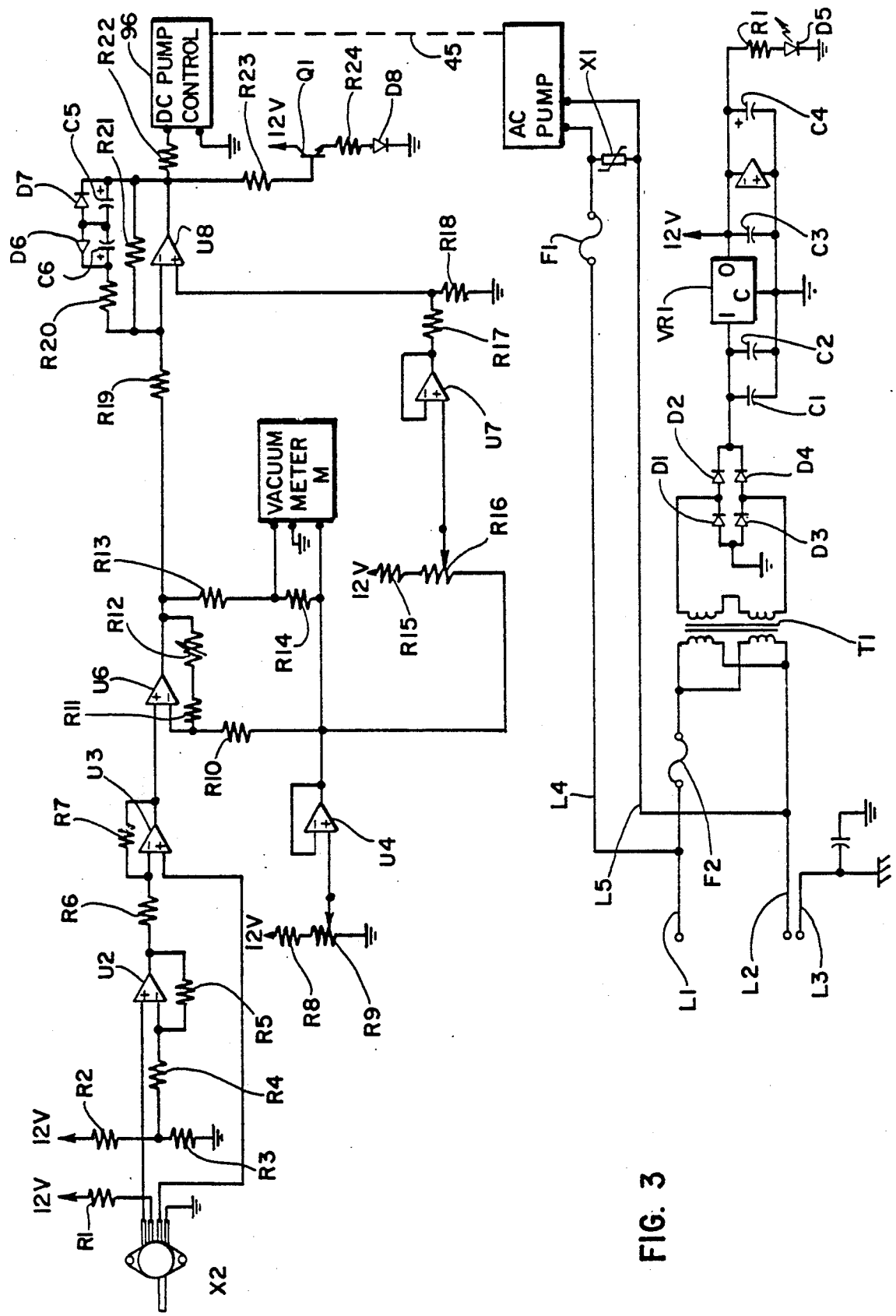
FIG. 3 displays a circuit diagram for maintaining the pressure within the vacuum sizing tank of FIGS. 1 and 2 constant.

In the circuit diagram of FIG. 3, the line voltage appears along the leads L1, L2, and L3. From there it travels along the upper leads L4 and L5, across the fuse F1 in the former and across the transient protector X1 to the a.c. motor portion 95 of the vacuum pump 45.

Further, the voltage along the leads L1 and L2 travels across the fuse F2 to the transformer T1 which steps it down. From there, the bridge consisting of the four diodes D1 to D4 rectify the output of the transformer T1 to a d.c. voltage. The capacitors C1 to C4, the voltage regulator VR1, and the operational amplifier U1 provide a filtered, regulated d.c. voltage. This voltage which passes across the resistor R1 to cause the light emitting diode D5 to light and indicate the operation of the circuit.

The vacuum pressure appears at the transducer X2 and then undergoes linear and temperature compensation by the operational amplifiers U2 to U4 along with their associated resistors. It then undergoes amplification by the amplifier U6 along with its associated resistors, of which the resistor R12 provides for calibration. The vacuum meter M displays a voltage from the vacuum sensor X2 calibrated as a vacuum pressure.

The resistors R15 and R16 permit the selection of a voltage indicative of the desired vacuum. This passes through the isolation buffer amplifier U7. This voltage along with that from the pressure transducer X2 appear at the main loop amplifier U8 which provides it to the d.c. control portion 96 of the pump 45. The diodes D6 and D7 and the capacitors C5 and C6 with their resistors R20 and R21 provide for the voltage gain and the appropriate time constant for the voltage of the d.c. pump control 96. The current appearing at the upper transistor Q1 permits the light emitting diode D8 to indicate the operation of the d.c. pump control 96. The components used in FIG. 3 appear in the table.

TABLE

Components Used in the Figures

| Identification | Component |
| --- | --- |
| C1, C5, C6 | 1000 µF |
| C2, C3 | 0.1 µF |
| C4 | 10 µF |
| D1-D4 | 1N4004 |
| D5, D8 | SCR56VR3 |
| D6, D7 | 1N4148 |
| F1 | .5 A |
| F2 | 5 A |
| Q1 | 2N4401 |
| R1 | 1910 Ω, 1% |
| R2, R7, R9, R16, R23 | 10 KΩ |
| R3, R19 | 1 KΩ |
| R4 | 4.12 KΩ |
| R5, R6 | 200 Ω |
| R8 | 22 KΩ |
| R10 | 20 KΩ |
| R11 | 2 KΩ |
| R12 | 50 KΩ |
| R13 | 3.3 KΩ, 1% |
| R14 | 1 KΩ, 1% |
| R15 | 15 KΩ |
| R17 | 3.3 KΩ |
| R18 | 100 KΩ |
| R20 | 1.5 KΩ |
| R21 | 4.7 KΩ |
| R22 | 100 Ω |
| R24 | 2.2 KΩ |
| U1-U8 | LM324 |
| VR1 | 7812CT |
| X1 | V130LA5 |
| X2 | MPX100GVP |
| METER M | TEXMATE PM-35A |
| PUMP 45 | AMETEK 116638-02 |

Accordingly, what is claimed is:

1. In a vacuum sizing tank substantially closed to the atmosphere including:
    (a) an enclosed trough capable of holding water and a vacuum, said trough having a first opening for the ingress of a molten plastic extrudate and a second opening for the egress of a cooled plastic extrudate; and
    (b) vacuum means for applying a vacuum to said trough,
the improvement (1) wherein said vacuum means applies any one of a plurality of different vacuums to said trough and (2) comprising:
    (A) detector means, coupled to said trough, for determining the pressure within said trough;
    (B) control means, coupled to said detector means and said vacuum means, for (1), when said detector means determines that the pressure has fallen below a predetermined value, causing said vacuum means to decrease the vacuum applied to said trough and (2), when said detector means determines that the pressure in said trough has risen above said predetermined value, causing said vacuum means to increase the vacuum applied to said trough.

2. The improvement of claim 1 further including selector means, coupled to said control means, for electronically selecting said predetermined value from a plurality of values.

3. The improvement of claim 2 wherein said detector means is electronic and is connected to determine the pressure within said trough electronically and to provide to said control means an electrical signal characteristic of the pressure detected within said trough.

4. The improvement of claim 3 wherein said vacuum means includes a vacuum pump with a variable speed d.c. controlled motor and said control means is connected to apply a d.c. control voltage to said motor.

5. The improvement of claim 4 wherein said motor is an a.c. motor.

6. The improvement of claim 4 wherein said vacuum means further includes an air-tight container coupled between said trough and said vacuum pump and in fluid communication with said vacuum pump and said trough and said pump is connected to apply said vacuum to said container.

7. The improvement of claim 6 wherein said trough includes means to provide water to a level covering said plastic and an area between the top of said water and the top of said trough and said container is in fluid communication with said area and including first and second passageways located between said trough and said container and providing said fluid communication, with the openings to said first and second passageways being located in said trough such that, when said water exceeds said level, said water enters only said first passageway.

8. The improvement of claim 7 wherein said detector means comprises a solid state pressure transducer.

9. A method of maintaining the vacuum in a vacuum sizing tank substantially closed to the atmosphere at a predetermined value comprising:
    (A) applying a vacuum to said tank with a vacuum means capable of applying any one of a plurality of different vacuums;
    (B) determining the pressure within said tank;
    (C) if the pressure within said tank falls below said predetermined value, reducing the vacuum applied by said vacuum means; and
    (D) if the pressure within said tank rises above said predetermined value, increasing the vacuum applied by said vacuum means.

10. The method of claim 9 further including the step of electronically selecting said predetermined value from a plurality of values and varying the vacuum to said value.

11. The method of claim 10 wherein the pressure within said tank is determined electronically.

12. The method of claim 11 wherein said vacuum is applied to said tank by a vacuum pump coupled to and in fluid communication with said trough and driven by a variable speed d.c. controlled motor and the reducing or increasing of the vacuum in said tank is accomplished by varying the d.c. voltage applied to said motor.

13. The method of claim 12 wherein said motor is an a.c. motor.

14. The method of claim 12 wherein said vacuum pump applies a vacuum to a container in fluid communication with said tank.

15. The method of claim 14 wherein said tank includes a layer of water and said container is in fluid communication with the area between the top of said water and the top of said tank and including first and second passageways between said trough and said container and providing said fluid communication, with the openings to said first and second passageways being located in said trough such that, when said water exceeds said level, said water enters only said first passageway.

16. The method of claim 15 wherein the pressure within said tank is determined by a solid state pressure transducer and the magnitude of said d.c. voltage is varied dependent upon the output of said transducer.

* * * * *